PN CODE SHIFT REGISTER GENERATOR

| STATES | STAGES 1 | 2 | 3(K) | 4(N) |
|---|---|---|---|---|
| (1) | 1 | 1 | 1 | 0 |
| (2) | 1 | 1 | 1 | 1 |
| (3) | 0 | 1 | 1 | 1 |
| (4) | 0 | 0 | 1 | 1 |
| (5) | 0 | 0 | 0 | 1 |
| (6) | 1 | 0 | 0 | 0 |
| (7) | 0 | 1 | 0 | 0 |
| (8) | 0 | 0 | 1 | 0 |
| (9) | 1 | 0 | 0 | 1 |
| (10) | 1 | 1 | 0 | 0 |
| (11) | 0 | 1 | 1 | 0 |
| (12) | 1 | 0 | 1 | 1 |
| (13) | 0 | 1 | 0 | 1 |
| (14) | 1 | 0 | 1 | 0 |
| (15) | 1 | 1 | 0 | 1 |
| (1) | 1 | 1 | 1 | 0 |
| (2) | 1 | 1 | 1 | 1 |
| (3) | 0 | 1 | 1 | 1 |

ONE PN CODE CYCLE

INVENTOR.
JAMES C. SPRINGETT
BY
[signature]
[signature]
ATTORNEYS

PN AUTOCORRELATION FUNCTION

CROSSCORRELATION FUNCTION PN⊕2f & PN(τ)

BASIC SYNC SYSTEM (PRIOR ART)

INVENTOR.
JAMES C. SPRINGETT
BY [signature]
[signature]
ATTORNEYS

INVENTOR.
JAMES C. SPRINGETT
BY
ATTORNEYS

Feb. 21, 1967 JAMES E. WEBB 3,305,636

ADMINISTRATOR OF THE NATIONAL AERONAUTICS AND SPACE ADMINISTRATION

PHASE-SHIFT DATA TRANSMISSION SYSTEM HAVING A PSEUDO-NOISE SYNC CODE MODULATED WITH THE DATA IN A SINGLE CHANNEL

Filed May 14, 1963 4 Sheets-Sheet 4

INVENTOR.

JAMES C. SPRINGETT

BY

ATTORNEYS 3,305,636

PHASE-SHIFT DATA TRANSMISSION SYSTEM HAVING A PSEUDO-NOISE SYNC CODE MODULATED WITH THE DATA IN A SINGLE CHANNEL

James E. Webb, Administrator of the National Aeronautics and Space Administration, with respect to an invention of James C. Springett, La Canada, Calif.

Filed May 14, 1963, Ser. No. 280,777
15 Claims. (Cl. 178—67)

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates generally to digital data communication systems of the type finding particular utility for transferring data, for example telemetry or command data, between a space craft and a ground station.

During the past several years, the predominant methods employed for the transfer of telemetry and command data between a space craft and ground stations have been characterized by the use of an uncoded binary symmetric channel. Much development work has been spent in attempting to optimize such systems and as a consequence, various implementations have been suggested in the prior art. Essentially, these communication systems consist of a serial binary data link wherein information is transmitted and detected in the biorthogonal sense, i.e., the cross-correlation between the received data signal and a detector reference signal is either +1 or −1 depending upon which binary state has been transmitted. When matched filter techniques (a matched filter, as used herein, is a network which has the characteristic that its impulse response is the time negative of the signal to be filtered and consists of an integrator which provides a constant output for a single impulse input, together with a discharge device for discharging the integrator at multiples of time T where T represents the duration of the signal to be filtered) are employed to maximize the probability of making the correct decision at the detector, the system becomes nearly optimum from the standpoint of bit error rate or error probability versus the transmitted signal energy per bit and the phase-noise spectral density within the detector. (See for example Viterbi, A. J., "On Coded Phase-Coherent Communications," Technical Report No. 32–25, Jet Propulsion Laboratory, Pasadena, August 1960.) Thus, the relationship $$P_e=\frac{1}{2}\left(1-erf\sqrt{\frac{ST}{N/B}}\right)$$

is the theoretical goal to be obtained where:

$P_e$ is the error probability;
*erf* is the error function;
S is the signal power;
T is the bit period; and
$N/B$ is the normalized phase-noise spectral density.

An elementary implementation of the foregoing type is described and shown in FIGURE 3 of a paper by J. C. Springett, and entitled "Command Techniques for the Remote Control of Interplanetary Space Craft," Technical Report No. 32–314, Jet Propulsion Laboratory, Pasadena, August 1962. The biorthogonal signals in that implementation consist of a split phase sinusoid such that + sin $(\omega_0 t)$ is transmitted to represent a binary "1" and − sin $(\omega_0 t)$ is transmitted to represent a binary "0." At the detector, the noise laden transmitted signal is correlated (multiplied) with a + sin $(\omega_0 t)$ reference signal to obtain either a 1− cos $(2\omega_0 t)$ or −1+ cos $(2\omega_0 t)$ dependent upon the transmitted bit. Since it is only the D.C. terms of these expressions which are of interest, the output of the detector can be connected to a matched filter which consists of an integrator which is periodically sampled and discharged. The matched filter serves to average the noise voltage and integrate the signal voltage to thereby provide a positive or negative level representative of the transmitted bits. In addition to the + sin $(\omega_0 t)$ reference signal, bit synchronization or timing is required at the detector to properly sample and discharge the integrator.

The basic concept of a system of this sort has been referred to as Phase-Shift-Keying (PSK) and in theory is rather simple. Theoretically, it is only necessary that phase information be available at the detector to establish the proper relationships to synchronize the received signal with the reference signal, since all other characteristics, that is, waveform and frequency, are known at the detector. However, a very significant practical difficulty lies in obtaining the necessary bit synchronization and reference signal within the detector with sufficient accuracy and stability. More particularly, should the detector reference signal, + sin $(\omega_0 t)$, have a phase error of an angle $\alpha$, then the efficiency of the detection process will be degraded by a factor of cos $\alpha$. If the bit synchronization timing for the matched filter is inaccurate, then sampling may take place too soon or too late, thereby reducing the probability of a correct decision being made. Also to be considered is any noise that may be superposed on any of these signals. For example, if the reference signal possesses jitter, even further losses in accuracy will result. Consequently, if near-optimum system performance is to be obtained, synchronization within the detector must be unique and as noise-free as possible.

As a consequence of these recognized deficiencies in basic systems of the type just discussed, a phase-shift-keying system has recently been proposed which relies on the use of maximum-length shift register (pseudo-noise or PN) code (see Baumert, L., M. Easterling, S.W. Golomb and A. Viterbi, "Coding Theory and Its Applications to Communications Systems," Technical Report No. 32–67, Jet Propulsion Laboratory, Pasadena, March 1961) which is both transmitted and generated in the detector to establish synchronization. By transmitting one data bit for each PN code cycle, and by utilizing correlation and phase lock techniques, improved synchronization is achieved and as a result, the error probability ($P_e$) of such a system is brought close to optimal.

An important factor to consider when implementing a phase-shift-keying system is that the requirements for synchronization should not significantly derate system performance; that is, if a finite amount of energy is available for the transmission of a data bit and the establishment of synchronization, then the energy expended to establish synchronization should be kept to a minimum. Obviously, the requirements of good synchronization coupled with a minimum expenditure of transmitter energy are somewhat contradictory. Consequently, the best compromise between these requirements must be made in the design of a practical system.

In the recently proposed phase-shift-keying systems which utilize the PN code synchronization technique, two transmission channels are utilized; i.e. a first channel for a carrier which is modulated by the data to be transmitted and a second channel for the synchronizing PN code. Although this type of phase-shift-keying system represents a significant advance over the prior art systems of the type to which reference was initially made above, the performance of the recently proposed systems is still somewhat less than satisfactory due to the fact that noise developed in the phase lock loop, used to lock the locally generated PN code to the received PN code, requires the expenditure of an undesirably large amount of power on the transmission of the synchronizing PN code signals.

In view of the above, it is an object of the present invention to provide an improved phase-shift-keying digital data communication system which utilizes a synchronizing PN code but which requires that considerably less power be expended on the transmission of that code than has been required in heretofore known systems.

More broadly, it is an object of this invention to provide an improved digital data communication system which is of exceedingly high accuracy, and which is able to satisfactorily operate over a wide range of data transmission rates.

Briefly, the invention herein is based on the recognition that the performance of a digital data communication system, in which a synchronization code is transmitted, can be significantly improved by modulating the synchronization code with the digital data so that both the synchronization and data information appear on a single channel to which can be applied all available sideband transmitting power.

It is pointed out that the invention herein is not concerned with the actual transmission of the synchronizing and data information in the sense of how this information is combined with an RF signal for transmission but rather is concerned with the manner in which this information is handled prior to combination with the RF signal at the transmitting station and subsequent to the removal of the RF signal at the receiving station.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
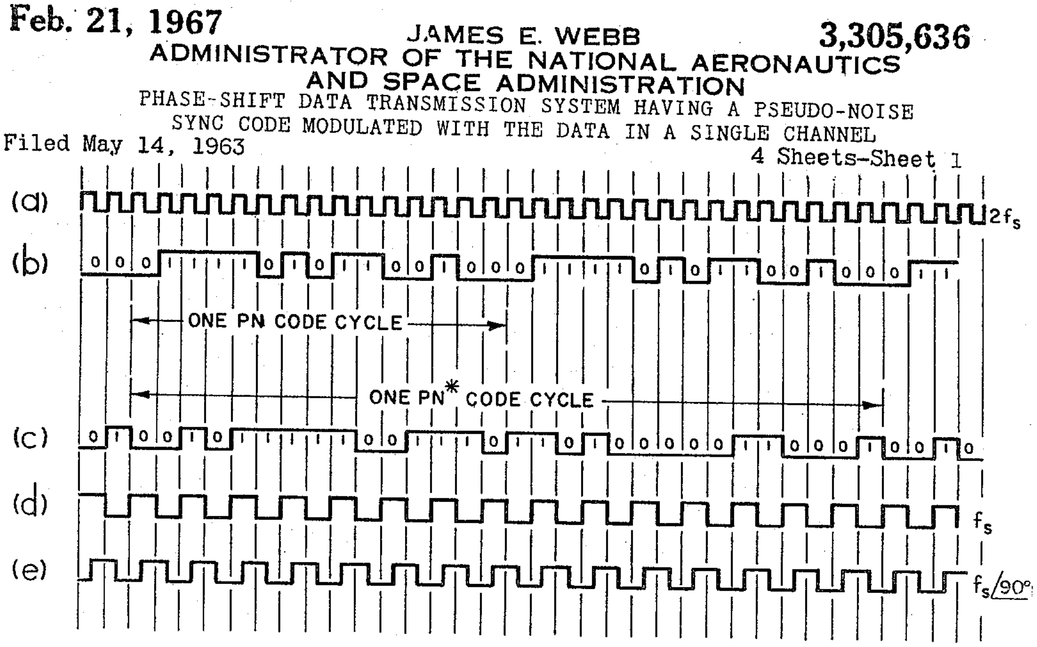
FIGURE 1 is a waveform chart illustrating the characteristics of a plurality of signals which are utilized in the digital data communication system comprising the present invention.
Figure 2:
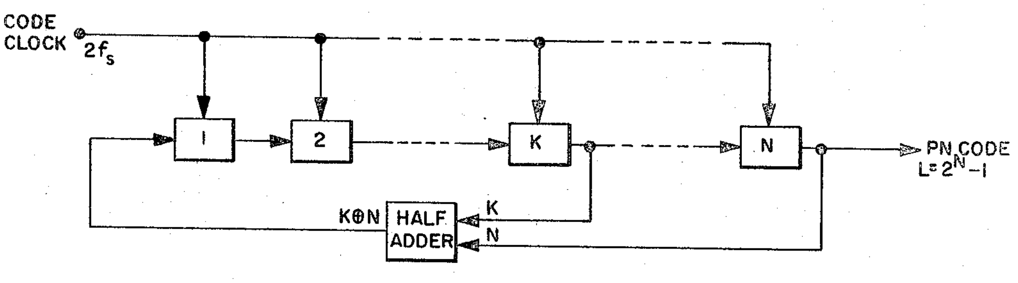
FIGURE 2 is a block diagram illustrating the apparatus employed to generate the PN code illustrated in FIGURE 1.

Attention is now called to FIGURES 1 and 2 of the drawings for the purpose of developing the synchronization concept utilized in a system constructed in accordance with the present invention.

There exists a family of binary codes of length $4^N-1$, N being an integer, the codes of which are characterized by their two level autocorrelation properties. (See Baumert, L., M. Easterling, S. W. Golomb and A. Viterbi, "Coding Theory and Its Applications to Communications Systems," Technical Report No. 32-67, Jet Propulsion Laboratory, Pasadena, March 1961.) In particular, there is a subclass of this family, namely those codes of length $2^N-1$, which in addition to having two level autocorrelation properties, also have cycle and add properties. The codes of this subclass are often referred to as maximum length shift register codes or pseudo-noise (PN) codes.

The cycle and add property has the characteristic that given a PN code of length $2^N-1$, and a cyclic permutation of the same PN code, the resulting modulo—2 sum (i.e., the sum obtainable by applying bits to be added to a half adder) is another cyclic permutation of the same PN code. For example, consider the 15 bit PN code 011110101100100, and a cyclic permutation thereof, 110101100100011. The modulo—2 sum of these permutations is formed as follows:

$$\begin{array}{r} 011110101100100 \\ \underline{110101100100011} \\ \overline{101011001000111} \end{array}$$

It should be noted that the modulo—2 sum constitutes a different cyclic permutation of the same PN code.

FIGURE 1 illustrates the waveform of a clock signal $2f_s$ [line $(a)$] which is utilized with the apparatus of FIGURE 2 to generate the PN code whose waveform is also illustrated in line $(b)$, FIGURE 1. The apparatus of FIGURE 2 comprises a shift register of N stages (N being equal to 4 when a 15 bit PN code is to be generated) connected to a source of clock signals $2f_s$. Each clock signal serves to shift the information stored in each stage of the shift register to a succeeding stage. A half adder is provided whose output is connected to the input of stage 1 of the shift register. The output of stages K and N which are respectively stages 3 and 4 in the illustrated embodiment, are connected to the input of the half adder. The output of stage N can serve as the output of the shift register, i.e., the source of the PN code.

As with all PN code generators of N stages, it can be shown that if the states of N stages are known for one sequential state of the shift register, all succeeding shift register states can be generated by connecting the output of stages K and N to the input of a half adder whose output is in turn coupled to the first stage of the shift register. That is, given at time $t_0$, the states of the shift register stages $$A_1A_2A_3\ .\ .\ .\ A_K\ .\ .\ .\ A_N$$

there exists at least a single K such that at time $t_1$ $$A_K(t_0)\oplus A_N(t_0)=A_1(t_1)$$

where the symbol $\oplus$ is utilized to represent a modulo—2 sum operation. As noted, where $N=4$ a PN code can be generated if K is equal to 3. The table illustrated in FIGURE 2 shows the fifteen nonzero states which the shift register assumes in the generation of the indicated PN code.

Autocorrelation is the measure of the similarity between a code and any cyclic permutation of the same code, and can be defined as $$R(\tau)=\text{Average }\{PN\oplus PN(\tau)\}/L$$

where $\tau$ is the measure of cyclic permutation, L is the length of the code, and the symbol $\oplus$ denotes the modulo—2 sum. Obviously, $R(\tau)=1$ only when $\tau=0$ since no cyclic permutation of the PN code can be in perfect agree ment with the code. For all other $\tau$, the autocorrelation function may take the form $$R(\tau)=\frac{(\text{Number of "0's"}-\text{number of "1's"})}{(\text{Number of "0's"}+\text{number of "1's"})}$$

for PN$\oplus$PN$(\tau)$. The number of 1's in a PN code is $2^N/2$ and the number of 0's is $(2^N-2)/2$. Since $$PN\oplus PN(\tau)$$

equals PN$(\tau')$ (that is to say the modulo—2 sum of the PN code and any specified cyclic permutation of the code provides a cyclic permutation which is not the specified cyclic permutation) and inasmuch as the code possesses the cycle and add property, it can be concluded that $$R(\tau')=[(2^N-2)/2-2^N/2]/L=-1/L$$

Figure 3A:
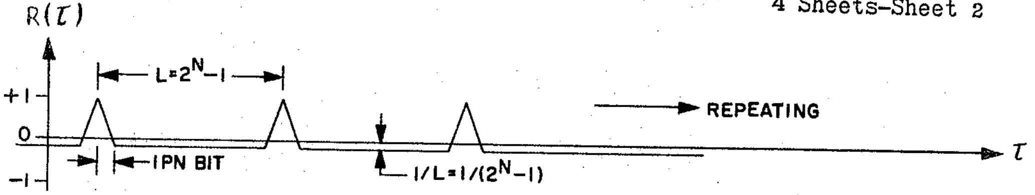
FIGURE 3 illustrates correlation functions of signals employed in the digital data communication system comprising the present invention.

Thus, the autocorrelation for the PN code is $+1$ for $\tau=0$, and $-1/L$ for all other $1 \leqq \tau \leqq L-1$. This autocorrelation function is illustrated in FIGURE 3*a*.

A source of the clock signals $2f_s$ whose waveform is illustrated in FIGURE 1 has already been referred to as being the clock source for the shift register of FIGURE 2. In addition to this clock signal, two other clock signals, $f_s$ and $f_s\angle 90°$, both illustrated in FIGURE 1 are now introduced. The relationship between these three clock signals is represented by:

$$2f_s = f_s \oplus f_s \angle 90°$$

This relationship can be easily verified by reference to FIGURE 1.

In addition to the PN code already defined and the three clock signals, a new code, PN* will now be defined as $PN \oplus f_s$. Since the PN code is of odd length and there exists a half cycle of signal $f_s$ for each PN code bit, code PN* will have a cycle length of 2L, being composed of a code of length L, followed by its complement. The PN* code is also illustrated in FIGURE 1.

The autocorrelation function of the PN* code may be derived from the autocorrelation function of the PN code in the following manner:

$$R^*(\tau) = \frac{\text{No. of zeros} - \text{No. of ones}}{\text{No. of zeros} + \text{No. of ones}}$$

for $PN^* \oplus PN^*(\tau)$.

Now, $$PN^* \oplus PN^*(\tau) = (PN \oplus f_s) \oplus (PN \oplus f_s)(\tau) = PN \oplus PN(\tau) \oplus f_s \oplus f_s(\tau)$$

For $\tau=2K$ where K refers to a half cycle of $f_s$ and may be equal to any integer $$f_s \oplus f_s(2K) = 00000 \ldots$$

For $\tau=2K-1$ where K refers to a half cycle of $f_s$ and may be equal to any integer $$f_s \oplus f_s(2K) = 11111 \ldots$$

therefore, $$R^*(2K) = \text{Ave } \{PN \oplus PN(2K)\}/L$$

and $$R^*(2K-1) = \text{Ave } \{\overline{PN \oplus PN(2K-1)}\}/L$$

Figures 3B, 3C:
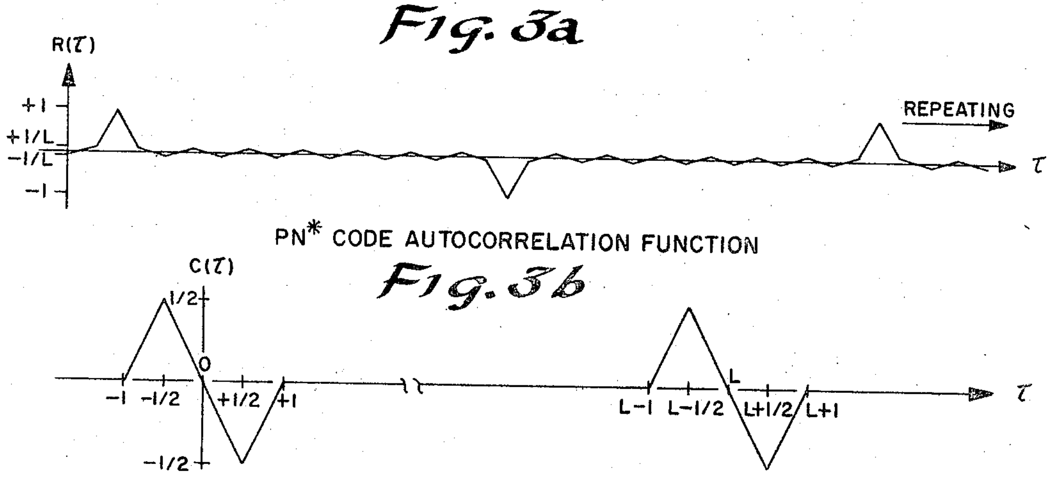

From the foregoing, it can be seen that the PN* autocorrelation function can be obtained from the PN autocorrelation function by plotting the latter for all $\tau$ equal to 2K, and the negative thereof for all $\tau$ equal to $2K-1$. The PN* autocorrelation function is illustrated in FIGURE 3*b* and it can be noted that the points of maximum correlation vary between $\pm 1$ and occur for each cycle of the PN code component. This latter property permits an unambiguous synchronizing system to be constructed as will become more apparent in light of the additional discussion herewith.

The autocorrelation properties of PN* codes provide the basis by which two identical PN code generators operating from independent clock sources (e.g. in a space craft and at a ground station) can be locked in time synchronism. Note the following code and clock combination:

$$PN \oplus 2f_s = PN \oplus f_s \oplus f_s \angle 90° = PN^* \oplus f_s \angle 90°$$

Whereas the autocorrelation function is the measure of the similarity between a code and any cyclic permutation of the same code, a cross correlation function is the comparison between two different codes, e.g. A and B and is defined by $$C(\tau) = \text{Ave } \{A \oplus B(\tau)\}/L_{AB}$$

where the average is taken over the product of the lengths of the two codes. If A is made equal to $PN \oplus 2f_s$, and B is made equal to PN, then $$A \oplus B(\tau) = PN \oplus 2f_s \oplus PN(\tau) = PN(\tau') \oplus 2f_s$$

for $\tau$ an integer. Since there is exactly one cycle of $2f_s$ for each PN bit, then Ave$[2f_s]$ per PN bit is zero, so that $C(\tau)=0$ for all $\tau$=integers.

$C(\tau)$ can now be evaluated for fractional values of $\tau$ in order to find its nonzero values. Since $PN \oplus PN(\tau)$ has a uniform autocorrelation for all values of $\tau$, including fractions, in a range of $1 \leqq |\tau| \leqq L$ (see FIGURE 3*a*), then $C(\tau)=0$ for all fractional values in this region since it has already shown to be zero for the integer values.

The only region left to be considered is $0<|\tau|<1$. For this region, a method outlined in Research Summary No. 36–10, vol. 1, Jet Propulsion Laboratory, September 1961, may be employed. The basic interval under consideration is that of one PN bit, and the concern is with two waveforms, namely one cycle of $2f_s$ and one PN bit which is chosen as a one. Outside of the interval, all states are equally likely. An average can be taken over the interval for which $PN \oplus 2f_s \oplus PN(\tau)$ is defined, and all averages outside the interval are zero. The resulting complete cross correlation function is shown in FIGURE 3*c*.

It can be seen that an "S" curve is generated each time the PN code passes through its point of maximum correlation and at all other times the function is zero. These properties are ideal for employing phase lock techniques to synchronize the two PN code generators, with the cross correlation function forming the loop error signal. (See Jaffe, L. and E. Rechtin, "Design and Performance of Phase-Lock Loops Capable of Near Optimum Performance Over a Wide Range of Input Signal and Noise Levels," IRE Transactions on Information Theory, PGIT vol. IT–1, No. 1, March 1955.)

Figure 4:
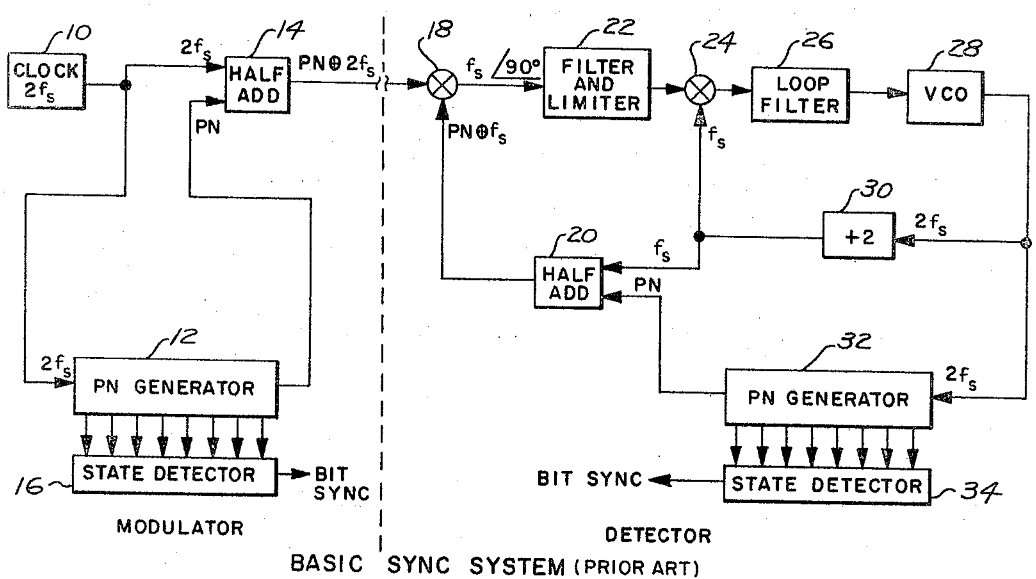
FIGURE 4 is a block diagram illustrating a basic digital data communication synchronization system employing a PN code.

Attention is now called to FIGURE 4 which illustrates a basic synchronizing system utilizing the properties of the discussed foregoing codes. The basic synchronizing system includes a modulator and a detector, which respectively comprise portions of a transmitter and a receiver in a digital data communication system. The modulator functions to generate the synchronizing PN code and the detector serve to ascertain the appropriate synchronization in view of the received PN code and a locally generated PN code. It is again pointed out that the invention herein is not concerned with the particular manner in which the PN code, and digital data information to be discussed below, are associted with an RF carrier signal for actually transmitting the synchronizing and data information. The invention herein is rather concerned with the manner in which the synchronizing code and data information are manipulated before they are placed on the RF carrier and after the RF carrier is removed. In other words, the invention herein may be considered as being concerned with signals in the audio frequency range, as distinguished from signals in the radio frequency range.

The modulator comprises a source 10 of clock signals having a frequency of $2f_s$. The output of source 10 is connected to the input of a PN code generator 12, which can take the form of the generator illustrated in FIGURE 2, and to the input of a half adder 14. The output of the PN code generator 12 is applied to the half adder 14 and as a consequence the output of the half adder can be represented by $PN \oplus 2f_s$. A state detector is connected to the PN code generator and functions to provide a bit synchronizing pulse once for each cycle of the PN code generator.

In the detector, the $PN \oplus 2f_s$ signal is applied to correlator 18 together with a signal $PN \oplus f_s$ derived from half adder 20. The output of correlator 18 consequently comprises a signal $f_s\angle 90°$ and is applied to a filter and limiter circuit 22. The center frequency of the filter 22 is adjusted to a frequency of $f_s$. The output of the filter 22 is applied to a correlator 24 together with a clock signal of frequency $f_s$. The output of correlator 24 comprises the error function which can be applied to a phase lock loop which includes loop filter 26 and a voltage controlled oscillator 28 which is adjusted to oscillate at a frequency of $2f_s$, and a frequency divider 30 which functions to halve the output frequency of the oscillator 28 prior to the amplification thereof to the correlator 24.

In addition to the initial loop through the frequency divider 30, a second loop exists through a PN code generator 32 which can be identical to the PN code generator 12 in the modulator. The output of the PN code generator 32 is applied to the half adder 20 together with the output of the frequency divider 30. A state detector 34 is connected to the PN code generator 32 and functions to generate a bit synchronization pulse for each cycle of the PN code generator 32.

When the phase lock loop is open, and a frequency difference exists between the output of the frequency divider 30 and the output of filter 22, the cross correlation function illustrated in FIGURE 3*c* will be obtained at the output of the correlator 24.

Essentially the detector operates to cross correlate the function $PN \oplus 2f_s$ with the function PN ($\tau$) to derive the cross correlation function illustrated in FIGURE 3*c*. When $\tau=0$, the cross correlation function is at a stable unique point which can be recognized. Although the detector correlation need only cross correlate $PN \oplus 2f_s$ with PN to obtain the error function for the phase lock loop, the illustrated detector correlates in two parts; that is in correlators 18 and 24, in order that predetection filtering in filter 22 can be employed prior to the phase lock loop. It should be apparent, that inasmuch as the locking point of the phase lock loop, as illustrated in FIGURE 3*c*, is unique, the PN codes must necessarily be correlated to +1 at such time. Consequently, the state detectors connected to each of the PN code generators can serve to provide unambiguous bit synchronization pulses. In addition to the bit synchronization pulses being obtained, since the $2f_s$ clock sources are phase coherent, the data detection reference is likewise obtained.

As previously noted, recently introduced digital data communication systems have utilized the basic synchronization technique illustrated in FIGURE 4. In all such systems introduced however, the digital data to be transmitted was used to modulate a clock signal of a first frequency while the synchronizing PN code signals were utilized to modulate a clock signal of a second frequency. Consequently, the data and synchronizing information were transmitted over separate channels and transmitter power utilized to drive the synchronizing information channel necessarily detracted from the power available to drive the data information channel. A prior art system of this type is illustrated in FIGURE 5 wherein FIGURE 5*a* illustrates a modulator and FIGURE 5*b* illustrates a detector.

In order to determine the optimum frequency for the data carrier to be utilized in the system of FIGURE 5 so as to minimize any interference between the data carrier and the synchronizing signal of $PN \oplus 2f_s$ which need be transmitted in accordance with the basic synchronizing technique of FIGURE 4, the power spectral density of the signal $PN \oplus 2f_s$ can be investigated. It can be determined that broad nulls occur in the spectrum at multiples of $4f_s$, and as a result, the data carrier in the system of FIGURE 5 is optimumly placed at $4f_s$.

Figure 5A:
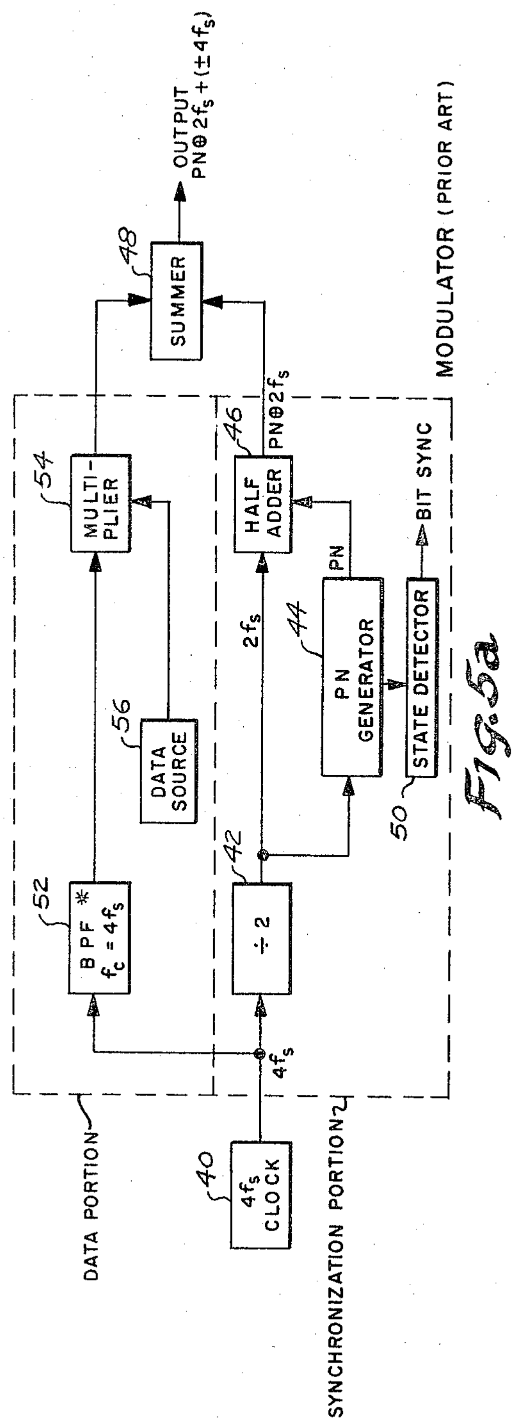
FIGURE 5 is a block diagram of a basic two channel prior art phase-shift-keying digital data communication system employing a PN code.
Figure 5B:
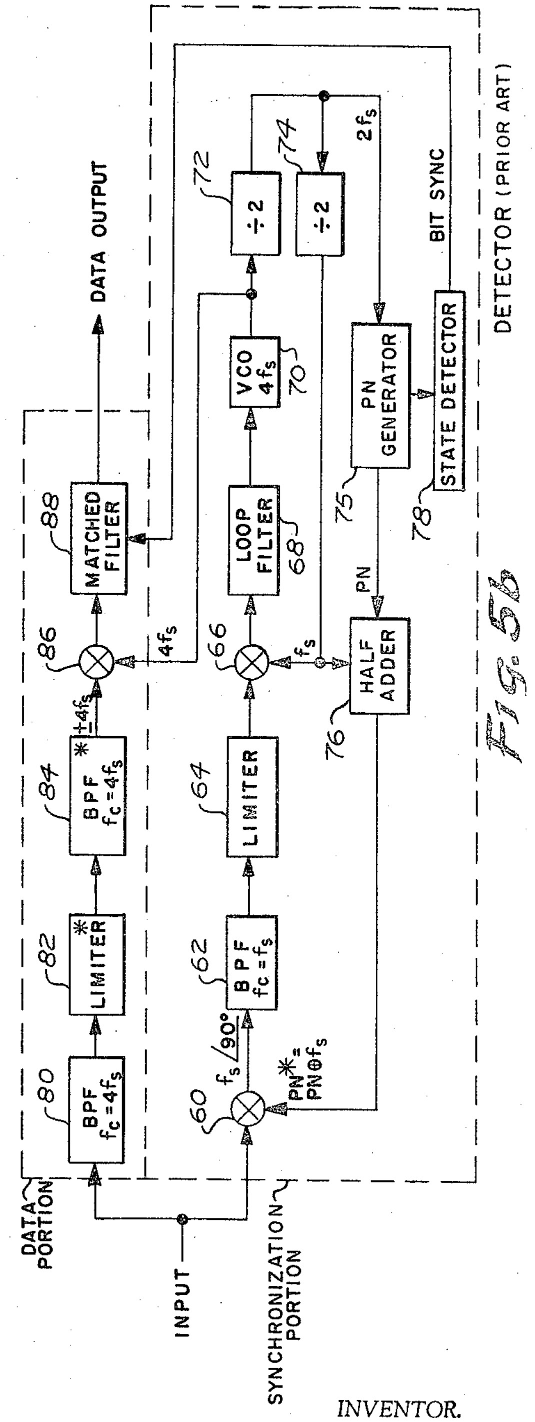

Attention is now called to FIGURE 5 which illustrates a modulator and a detector utilized in a prior art digital data communication system employing the previously discussed PN code synchronizing technique. The modulator (FIGURE 5*a*) includes a source 40 of clock signals having a frequency of $4f_s$. The output of the source 40 is coupled to the synchronization portion of the modulator through a frequency divider 42 to the input of a PN code generator 44. The output of the PN code generator 44 together with the $2f_s$ clock signal derived from the frequency divider 42 are applied to a half adder 46, the output of the half adder providing a signal $PN \oplus 2f_s$ to a summing circuit 48. The PN code generator is connected to a state detector 50 which provides bit synchronization pulses. It should be recognized that the synchronization portion of the modulator is identical to the modulator illustrated in FIGURE 4.

The modulator of FIGURE 5*a* however differs from the modulator shown in FIGURE 4 by virtue of the incorporation therein of the data portion. The data portion of the modulator includes a band pass filter 52 whose center frequency is placed at $4f_s$. The output of the source 40 is connected through the band pass filter 52 and applied to a multiplier 54 along with the output of a digital data source 56. The output of the multiplier 54 is applied to the summing circuit 48 so that the summing circuit 48 effectively provides two output signals of different frequencies; i.e. a synchronizing signal $PN \oplus 2f_s$ and a modulated data carrier $\pm 4f_s$. In other words, the output of the summing circuit 48 consists of the combined data and synchronization signals in the form $$K_1(\text{data} \times 4f_s) + K_2(PN \oplus 2f_s)$$

where $K_1$ and $K_2$ are weighting constants which allocate the proper amount of available transmitter power to each signal. As previously pointed out, the output of the summing circuit 48 would be applied to a signal of RF frequency to cause it to be transmitted as from a space craft to a ground station. However, for purposes of the present disclosure, the apparatus in both the transmitter and receiver for handling the RF carrier will not be discussed.

At the detector input, the output of the summing circuit 48 enters the synchronization portion of the detector and is applied to a correlator 60 along with the signal PN* which it will be recalled is equal to $PN \oplus f_s$. The output of correlator 60 consequently comprises a signal $f_s \angle 90°$ corresponding to the synchronization signal derived from the summing circuit 48. The effect of correlating PN* with the modulated data carrier derived from the summing circuit 48 is to spread the data carrier over a wide frequency band so that it is effectively filtered out by the band pass filter 62 which has a center frequency equal to $f_s$. Consequently, a signal $f_s \angle 90°$ is applied through the band pass filter 62 and limiter 64 to a correlator 66. Additionally, a clock signal of frequency $f_s$ is applied to the correlator 66 and the output of the correlator 66 is applied to a loop filter 68 whose output is in turn applied to a voltage controlled oscillator 70. The output of the voltage controlled oscillator 70 is applied through a pair of frequency dividers 72 and 74 to derive the signal $f_s$ which as noted is applied to the correlator 66. The output of the frequency divider 72 is applied to a PN code generator 75 whose output is applied to a half adder 76 along with the output of the frequency divider 74. The output of the half adder 76 constitutes the signal PN* which is applied to the correlator 60. The output of the PN code generator 75 is connected to a state detector 78 for the derivation of bit synchronization pulses. It should be apparent that the synchronization portion of the detector of FIGURE 5*b* is identical to the aforedescribed detector of FIGURE 4. The detector of FIGURE 5*b* differs from the detector of FIGURE 4 however by virtue of the inclusion of a data portion.

The data portion of the detector of FIGURE 5*b* includes a band pass filter 80, whose center frequency is equal to $4f_s$, which is connected between the detector input and a limiter 82. The output of the limiter 82 is connected to the input of a second band pass filter 84 whose center frequency is also equal to $4f_s$. The output of the filter 84 is connected to the input of a correlator 86 along with the output of the voltage controlled oscillator 70 from the synchronization portion of the detector. The output of the correlator 86 is applied to a matched filter which functions to integrate the output of the correlator 86. As previously pointed out, the matched filter 88 includes an integrator whose impulse response is the time negative of the signal applied thereto. The matched filter includes an integrating capacitor which is charged by the input signal and periodically discharged and sampled in response to the generation of bit synchronization pulses derived from the state detector 78 of the synchronization portion of the detector. Consequently, the output of the matched filter 88 functions to integrate data signals applied thereto and average noise components superimposed thereon.

The band pass filter 80 serves to select the modulated data carrier from the detector input spectrum and the limiter 82, and band pass filter 84 functions to limit the dynamic range of the signal prior to its application to the correlator 86.

Although, as previously pointed out, a prior art system constructed in accordance with the teachings of FIGURE 5 represented a significant advance over systems known prior thereto, the performance of the system of FIGURE 5 proved to be unsatisfactory for several reasons. More particularly, the phase noise in a phase lock loop is dependent upon the signal to noise ratio in the noise bandwidth of the loop and as the signal to noise ratio approaches zero db, i.e. becomes very noisy, in the loop bandwidth, the r.m.s. phase jitter in the loop would be about one radian which would severely limit the accuracy and reliability of the system. In laboratory experiments which have been conducted, a practical threshold of operation for the phase lock loop of the detector of FIGURE 5*b* has been determined requiring that the signal to noise ratio in the loop be above six db. For the six db signal to noise ratio, the r.m.s. phase jitter on the voltage controlled oscillator operating at a frequency $f_s$ is approximately .15 radians. Since the detector or data channel reference signal has a frequency of $4f_s$, it possesses an r.m.s. phase jitter of about .6 radians. For an r.m.s. reference jitter of this magnitude, a significant loss results in the signal to noise ratio in the data channel portion of the detector which is of course undesirable.

The apparent solutions for rectifying these deficiencies in the two channel system of FIGURE 5 is to (1) lower the noise bandwidth of the phase lock loop and (2) allocate a greater percentage of the available transmitter power to the synchronization channel. The first solution is not easily achievable because of the practical hardware limitations involved in lowering the noise bandwidth of the phase lock loop. The second solution proves to be less than fully satisfactory since experiments indicate that approximately twice as much power need be allocated to the synchronization channel as is allocated to the data channel for optimum error probability to be achieved when the data bit rate is one bit per second. However, where such a relatively enormous amount of power need be expended on the synchronization channel, the system is extremely inefficient.

Consequently, in view of the limitations of the two channel system of FIGURE 5, a single channel digital data communication system, a preferred embodiment of which is illustrated in FIGURE 6, is disclosed herein. The system of FIGURE 6 is characterized by the utilization of the digital data to modulate the synchronization code rather than to modulate a separate data carrier as was the case in the system of FIGURE 5. The distinct advantage of utilizing the data to modulate the synchronization code is that all of the available transmitter sideband power is utilized to transmit both data and synchronization information. Thus, for data bit "1," a signal of $+(PN\oplus 2f_s)$ is transmitted and for a data bit "0," a signal of $-(PN\oplus 2f_s)$ is transmitted. For the sake of simplicity, it will be assumed that switching of the signal $PN\oplus 2f_s$ *takes place* only once per cycle of the PN code, but in fact, it has been found that this restriction is not necessary.

Figure 6A:
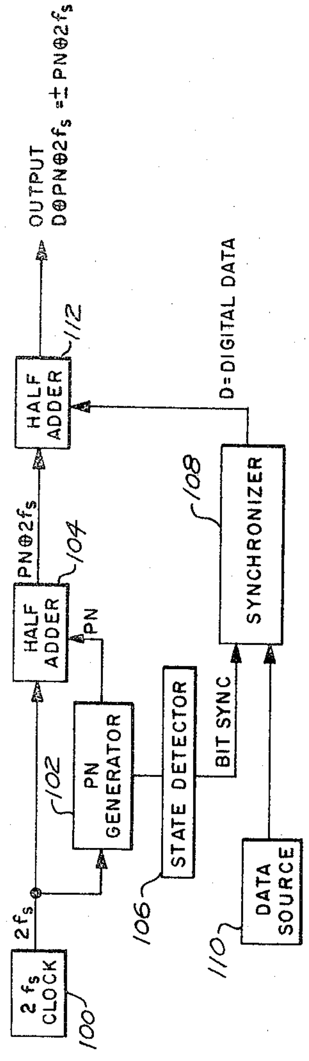
FIGURE 6 is a block diagram of a single channel phase-shift-keying digital data communication system employing a PN code and constituting a preferred embodiment of the present invention.

FIGURE 6*a* illustrates the single channel modulator and includes a source 100 of clock signals having a frequency $2f_s$. The output of source 100 is applied to a PN code generator 102 and to a half adder 104. The output of the PN code generator 102 is also applied to the half adder 104 so that the output of the half adder 104 comprises a signal equal to $PN\oplus 2f_s$. The output of the PN code generator is applied to a state detector 106 which generates a single bit synchronization pulse for each cycle of the PN code generator. The output of the state detector is applied to a synchronizer circuit 108 along with the output of a digital data source 110. The synchronizer 108 merely comprises logical gating means which permits the digital data to be applied to a half adder 112 at time determined by the generation of bit synchronization pulses from the state detector 106. The output of half adder 104 is connected to the input of half adder 112. The output of half adder 112 is consequently equal to $\pm(PN\oplus 2f_s)$, depending upon whether the data bit is a "1" or a "0."

Figure 6B:
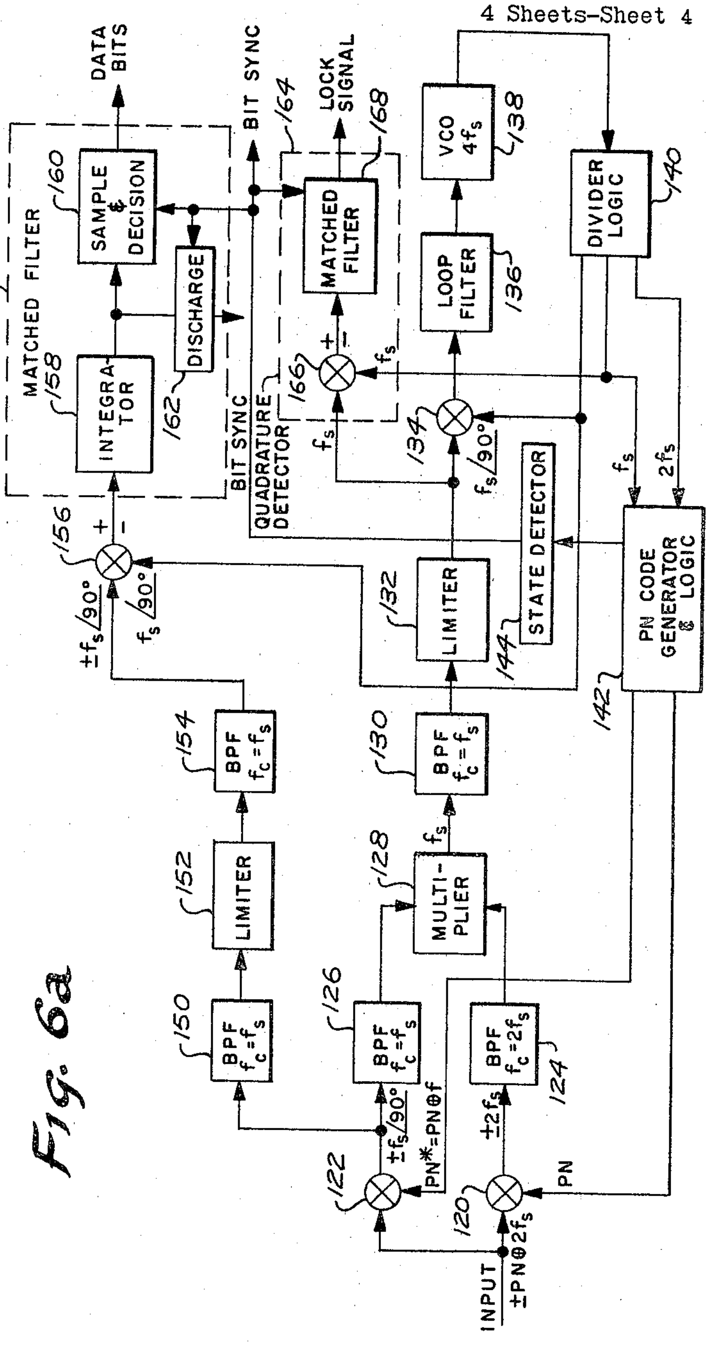

The output of the half adder 112 of FIGURE 6*a* is connected to the input of the detector illustrated in FIGURE 6*b*. Prior to considering the implementation of the detector, it would be appropriate to consider the nature of the output signal derived from the half adder 112. For this purpose, attention is again called to the cross correlation function of signals $PN\oplus 2f_s$ and $PN$ as shown in FIGURE 3*c*. Since the cross correlation function illustrated is for $+(PN\oplus 2f_s)$ and $PN$, it will be inverted for $-(PN\oplus 2f_s)$ and $PN$. Obviously, such an occurrence is unsuitable for the derivation of the error function for the phase lock loop utilized in the detector of FIGURE 6*b* because although the cross correlation function of FIGURE 3*c* represents a stable phase lock loop error function, its inverted form represents an unstable condition. As a result, the modulation by the data of $PN\oplus 2f_s$ must be removed from the detector of FIGURE 6*b* prior to forming the phase lock loop error function. Since, no apriori knowledge of the data is available within the detector, removal of the data component must be accomplished by means of feedback techniques.

Fortunately, the properties of signals $PN\oplus 2f_s$, PN and PN*, readily lend themselves to a relatively simple implementation for removal of the data component as shown in FIGURE 6*b*. More particularly, the input signal, $\pm PN\oplus 2f_s$, is multiplied by signal PN in correlator 120 and by signal PN* in correlator 122 to respectively obtain signals $\pm 2f_s$, and $\pm f_s\angle 90°$, when the PN components are correlated. The outputs of the correlators 120 and 122 are respectively applied to band pass filters 124 and 126 which respectively have center frequencies of $2f_s$ and $f_s$. The outputs of the band pass filters 124 and 126 are multiplied together by multiplier 128 to obtain a nonphase inverting waveform whose fundamental frequency is $f_s$. The output of multiplier 128 is applied to band pass filter 130 and then through a limiter 132 to a correlator 134 together with a signal $f_s\angle 90°$. The output of correlator 134 comprises the phase lock loop error function and is applied through a loop filter 136 to a voltage controlled oscillator 138 which provides an output signal having a frequency $4f_s$.

The output of the voltage controlled oscillator 138 is applied to a divider logic network 140 which in turn provides signals $f_s\angle 90°$, $f_s$ and $2f_s$. The latter two signals are applied to a PN code generator and logic network 142 which respectively provides the signals PN and $PN\oplus f_s$ ($PN^*$) to correlators 120 and 122.

A state detector 144 is connected to the output of the PN code generator and logic circuit 142 for the purpose of providing a bit synchronization pulse for each cycle of the PN code generator.

The phase lock loop portion of the detector of FIGURE 6*b* subsequent to the correlator 134 is similar to that previously discussed in connection with FIGURE 5*b*. It should be noted that the portion of FIGURE 6*b* prior to the correlator 134 however is significantly different from anything heretofore discussed. More particularly, it should be noted that the band pass filters 124 and 126 connected to the output of correlators 120 and 122 are very significant to the operation of the detector. Initially, they are instrumental in forming the proper signal relationships, as without them, the output of multiplier 128 would be virtually independent of any input considerations. Secondly, they contribute to the formation of the phase lock loop error function, and finally, their noise band-width is important in determining signal to noise ratio losses that result in the multiplication of the noisy $\pm 2f_s$ and $\pm f_s\angle 90°$ signals to obtain the non-phase switching $f_s$ signal.

The data bits are obtained in the detector of FIGURE 6*b* by investigating the nature of the output signal obtained from the corelator 122. The output of the correlator 122 is connected to a band pass filter 150 whose center frequency is equal to $f_s$. The output of the filter 150 is connected through a limiter 152 to a second filter 154. The output of the second filter 154 is applied to a correlator 156 together with a signal $f_s\angle 90°$ derived from the divider logic circuit 140. Consequently, the polarity of the output signal derived from the correlator 156 will indicate whether the data bit applied to the detector input terminal constituted a binary "1" or binary "0."

The output of correlator 156 is connected to a matched filter 157 which includes an integrator 158, a sample and decision network 160, and a discharge circuit 162. The sample and decision network 160 and discharge circuit 162 are synchronized by the bit synchronization pulses derived from the state detector 144. The output of the sample and decision network 160 constitutes the data bits derived from the data source 110 shown in FIGURE 6*a*.

In addition to the foregoing elements, a quadrature detector 164 including a correlator 166 and a matched filter 168 are provided. A signal $f_s$ derived from the limiter 132 and a signal $f_s$ derived from the divider logic network 140 are applied to the correlator 166. The output of the correlator 166 is applied to the matched filter 168. The quadrature detector serves to indicate when the phase lock loop is locked for the purpose of informing decoding equipment (not shown) when to accept data information from the sample and decision network 160. The utilization of the quadrature detector is desirable because when the phase lock loop is out of lock, noise signals applied to the matched filter 157 should not be decoded as data information.

From the foregoing, it should be appreciated that a single channel digital data communication system has been disclosed herein which makes use of a transmitted and locally generated PN code for synchronizing a locally generated data carrier with a transmitted data carrier. The single channel system disclosed herein is characterized by the utilization of the digital data signals to modulate the synchronizing PN code. This technique represents a significant difference from prior art techniques in which the data and synchronizing PN code were transmitted on separate channels.

The advantages derived from utilization of a single channel digital communication system as compared with the more conventional two channel system is twofold. Initially, utilization of a single channel system permits all of the available transmitted power to be applied to the transmission of both the data and synchronization information so that the system can operate more efficiently thereby permitting improved accuracy and reliability to be obtained with the same expenditure of power under the same environmental conditions. The second advantage derived from the utilization of a single channel system as contrasted with a two channel system involves the frequency of the data carrier. That is, the data carrier in the single channel system disclosed has a frequency of $f_s$ as distinguished from the frequency $4f_s$ in the prior art two channel system. Consequently, the fourfold increase in jitter on the detector reference signal encountered in the two channel system is avoided.

What is claimed is:

1. In a digital data communication system, transmitting apparatus including a clock signal source; a cyclic binary code generator; first means connecting said code generator to said clock signal source for causing the code generated by said generator to modulate the clock signal produced by said clock signal source; a binary data signal source; and second means connecting said data signal source to said first means for causing the data signal produced by said data signal source to modulate said modulated clock signal.

2. In a digital data communication system, transmitting apparatus including a clock signal source; means for serially generating the bits of a predetermined multibit binary code and for cyclically generating said binary code in response to the clock signal generated by said source; means for modulating said clock signal in accordance with said serially generated bits; a source of serially provided data bits; and means for modulating said modulated clock signal in accordance with said serially provided data bits.

3. The apparatus of claim 2 wherein said source of data bits is responsive to the generation of predetermined bit sequences by said code generating means for causing said data bits to be serially provided.

4. The apparatus of claim 2 wherein said binary code comprises a binary pseudo noise code.

5. A method of communicating digital data and synchronizing information between a transmitting and receiving station including the steps of generating a clock signal; serially generating bits of a first binary pseudo noise code in response to said clock signal; cyclically generating said first pseudo noise code; modulating said clock signal in accordance with said serially generated first pseudo noise code bits; serially generating binary data bits in response to said clock signal; and modulating said modulated clock signal in accordance with said serially generated data bits.

6. A method of communicating digital data and synchronizing information between a transmitting and receiving station including the steps of generating a clock signal; serially generating bits of a first binary pseudo noise code in response to said clock signal; cyclically generating said first pseudo noise code; modulating said clock signal in accordance with said serially generated first pseudo noise code bits; serially generating binary data bits in response to said clock signal; modulating said modulated clock signal in accordance with said serially generated data bits to develop a twice modulated clock signal; serially generating bits of a second pseudo noise code identical to said first pseudo noise code; correlating said second pseudo noise code with the pseudo noise code component of said twice modulated clock signal; and determining said data bits of said twice modulated clock signal when said second pseudo noise code is correlated with said pseudo noise code component of said twice modulated clock signal.

7. A digital data communication system including a source of a clock signal; means for serially generating bits of a first binary pseudo noise code in synchronism with said clock signal; means for cyclically generating said first pseudo noise code; means for modulating said clock signal in accordance with said serially generated first pseudo noise code bits; means for serially generating binary data bits in synchronism with said clock signal; means for modulating said modulated clock signal in accordance with said serially generated data bits to develop a twice modulated clock signal; means for serially generating bits of a second pseudo noise code identical to said first pseudo noise code; means for cyclically generating said second pseudo noise code; means for correlating said second pseudo noise code with the pseudo noise component of said twice modulated clock signal; and means for determining said data bits of said twice modulated clock signal when said second pseudo noise code is correlated with said pseudo noise component of said twice modulated clock signal.

8. The system of claim 7 wherein said means for correlating includes a phase lock loop; and means for generating an error input signal to said phase lock loop.

9. The system of claim 8 wherein said means for generating said loop error input signal includes means for separating the data and code components of said twice modulated clock signal.

10. The system of claim 7 wherein said means for modulating comprises a half adder and the following expressions respectively define the initially modulated clock signal and the twice modulated clock signal:

(1) $PN \oplus 2f_s$
(2) $\pm(PN \oplus 2f_s)$ where PN represents said first pseudo noise code, $2f_s$ represents said clock signal and $\oplus$ represents the half adder function.

11. The system of claim 10 wherein said means for correlating includes a phase lock loop; and means for generating an error input signal to said phase lock loop.

12. The system of claim 11 wherein said means for generating said phase lock loop error input signal includes means for respectively multiplying said signal equal to $\pm(PN \oplus 2f_s)$ by signals (3) PN
(4) $PN \oplus f_s$ where $f_s$ represents a signal having one half the frequency of said clock signal to obtain signals (5) $\pm f_s \angle 90°$
(6) $\pm 2f_s$; and means for multiplying signals $\pm f_s \angle 90°$ and $\pm 2f_s$ together to obtain a signal $f_s$ which is independent of any data bits component.

13. The system of claim 12 including a data demodulating circuit; said signal $\pm f_s \angle 90°$ being applied to said data demodulating circuit; and means for correlating said signal $\pm f_s \angle 90°$ with a signal $f_s \angle 90°$ generated by said phase lock loop.

14. The system of claim 13 wherein said data channel includes a matched filter comprising an integrating capacitor, and sampling and discharge circuits; and means in said phase lock loop for generating pulse signals identifying data bit intervals; said sampling and discharge circuits being responsive to said pulse signals.

15. The system of claim 14 including detector means connected to said phase lock loop for sensing when said loop is locked.

References Cited by the Examiner

UNITED STATES PATENTS

| | | | |
|---|---|---|---|
| 2,415,919 | 2/1947 | Thomas | 325—40 |
| 3,244,808 | 4/1966 | Roberts | 325—42 |

ROBERT L. GRIFFIN, *Primary Examiner.*

J. T. STRATMAN, *Assistant Examiner.*